United States Patent Office 3,826,753
Patented July 30, 1974

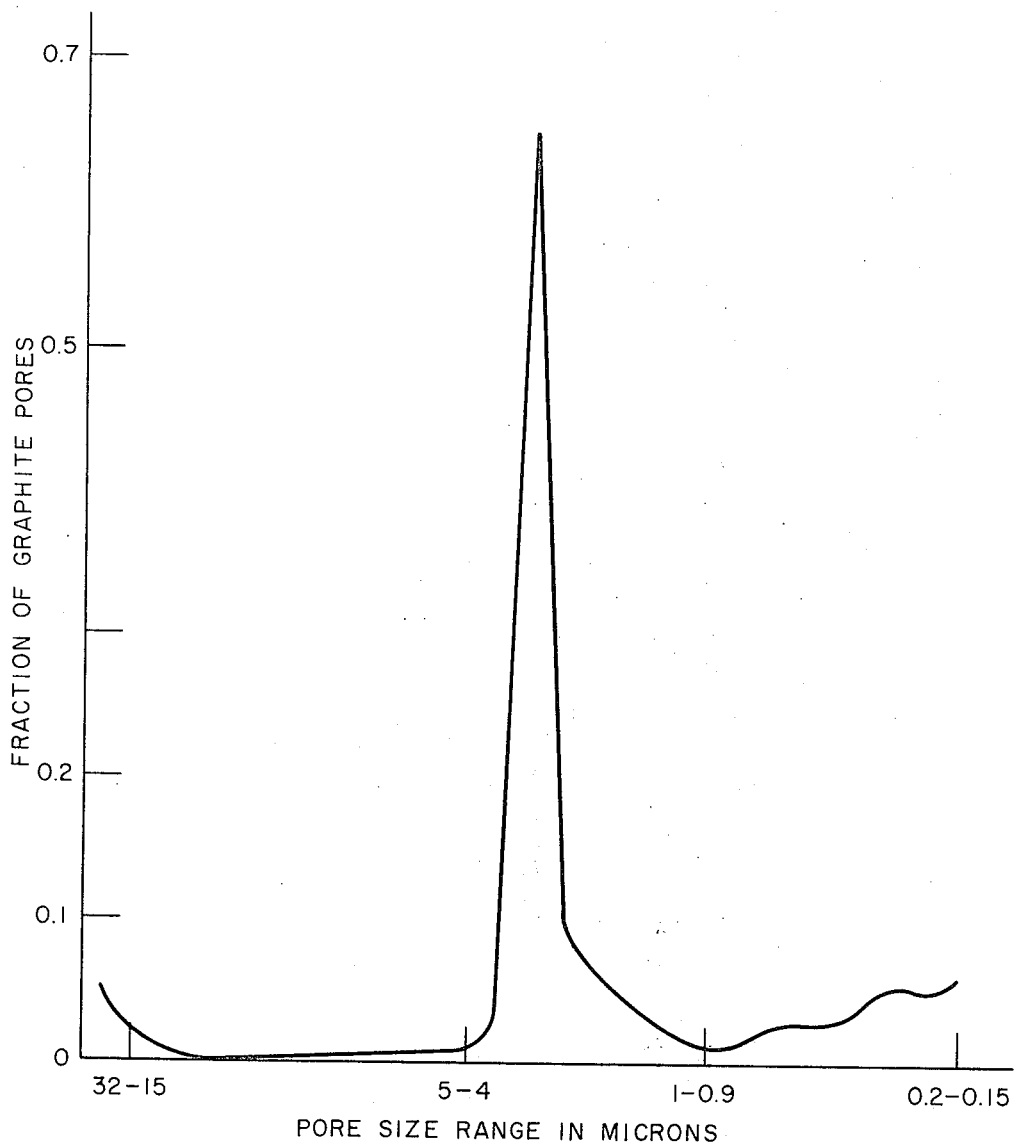

3,826,753
STABILIZED URANYL NITRATE COMPOSITIONS AND URANIUM IMPREGNATION METHOD
Robert E. Elson, Hayward, Raymond D. Heminger, Livermore, and Geoffrey R. Tully, Jr., Alamo, Calif., assignors to the United States of America as represented by the United States Atomic Energy Commission
Filed Oct. 24, 1958, Ser. No. 769,520
Int. Cl. C09k 3/00
U.S. Cl. 252—301.1 R
14 Claims

ABSTRACT OF THE DISCLOSURE

Stabilized tertiary butyl alcohol solution for impregnation of graphite with uranyl nitrate dihydrate.

---

This invention relates in general to the stabilization of uranyl nitrate solutions dissolved in an alcoholic solvent, particularly tertiary butyl alcohol. It also relates to a method for the impregnation of graphite with uranium using stabilized solutions of uranyl nitrate dissolved in tertiary butyl alcohol.

Uranyl nitrate dihydrate (UND) is commonly known to be soluble in tertiary butyl alcohol (TBA), and such solutions are frequently used in the laboratory where a solution of a uranium compound in an organic solvent is desired. A more specific use for such solutions is the impregnation of graphite with uranium-235, a nuclear fuel. Such impregnation is accomplished by contact of the solution with graphite, whereby the solution penetrates the graphite by capillary action. Sometimes the graphite pores are previously evacuated so that the solution is adsorbed more readily, as taught in the art. After impregnation, the solvent in the graphite is frozen and sublimed out under vacuum. The graphite is then baked out, leaving graphite impregnated with uranium oxide or carbide. The impregnated graphite may be used as a neutronic heater, reactor core, or fuel element where both fissile material and moderator are desired in one piece. Spent fuel is easily separated from the graphite.

While considerable success has been obtained in various applications, i.e., impregnation of graphite, practical utility has been limited severely since the UND-TBA solutions are not stable. Although the specific reaction mechanism is not known, the uranyl nitrate appears to undergo a solvolysis reaction yielding an insoluble uranium oxide solvate by which the uranium is precipitated. The reaction rates are unknown, but precipitation becomes a serious factor with solution storage times of the order of two or three days. The precipitation rate is strongly dependent upon temperature and is accelerated at temperatures approaching 50° C. and above. It is generally advantageous in the impregnation of such solutions into porous materials and in the further deposition of uranium therein to carry out the infusion operations at temperatures in the range of 40° to 70° C. to insure initial solubility, to reduce viscosity effects, accelerate permeation and the like; however, the unpredictable and premature precipitation of the uranium at these temperatures adversely affects the uniformity of distribution on impregnation by clogging surface pores and changing solution concentration. Extended storage aggravates or completely obviates use of the solution, since the solution strength changes rapidly. There is also introduced a hazardous possibility of collecting a critical amount of uranium-235 in the bottom of the container in the event a major precipitation should occur.

Now it has been discovered that such solutions are stabilized upon the addition of certain organic acid compounds. Specific amounts of acetic, lactic and monochloroacetic acids and acetic anhydride have been found effective. Stabilization of the solution by the additives may be explained by two possible mechanisms. Lactic acid is thought to complex the uranium in the solution so that the solvolysis precipitation reaction no longer occurs. Acetic anhydride, on the other hand, is believed to raise the acidity of the solution to a point where no precipitation takes place. By adding the specified additives in certain critical amounts the viscosity and other solution properties can be controlled so that the stabilized solution can be used for the impregnation of graphite.

Accordingly, it is an object of the invention to provide a stable solution of uranyl nitrate dihydrate dissolved in alcoholic solvent.

Another object of the invention is to provide an additive material for stabilizing solutions of UND dissolved in TBA.

A further object of this invention is to provide a means of increasing the length of time during which uranyl nitrate dihydrate remains dissolved in tertiary butyl alcohol.

A further object of this invention is to provide a stabilized UND-TBA solution for the impregnation of porous materials with uranium.

A still further object of the invention is to provide stabilized UND-TBA solutions for the impregnation of graphite in the production of fuel for nuclear reactors.

Still another object of the invention is to provide an improved process for the impregnation of a porous material employing a stabilized solution of UND in an alcoholic solvent.

Other objects and advantages of the invention will become apparent by consideration of the following description and figure, of which the figure is a graph showing the pore size distribution in a typical moderator grade graphite.

The additives of the invention are considered to be employable for stabilizing alcoholic solutions of uranyl nitrate, in general, and more particularly, for stabilizing uranyl nitrate hydrate solutions in low molecular weight alcohol solvents. Such additives are especially applicable for the stabilization of solutions containing uranyl nitrate dihydrate (UND) in tertiary butyl alcohol (TBA).

UND of whatever source and of whatever isotopic composition may be employed. For example, uranyl nitrate hexahydrate, the usual crystalline form in which uranyl nitrate exists, can be dissicated to yield such UND. Storage in a dissicator or other dissicative treatment to constant weight at 90° C. generally effects such conversion. The UND ($UO_2(NO_3)_2 \cdot 2H_2O$) is dissolved by conventional procedures. If a turbid orange colored solution results some decomposition of the uranyl nitrate may be presumed to have occurred. In this case a small amount of fuming nitric acid is added whereupon the color of the solution changes to a clear yellow color. In the event that the solution is to be employed for producing uranium impregnated graphite fuel elements or cores, the concentration of UND in the solution is determined by the available porosity of the graphite, the isotopic enrichment factor of the uranium and the desired graphite to uranium-235 mole ratio of the reactor design, as determined by standard methods. The latter mole ratios usually run from about *350/1* to *2000/1* for most homogeneous uranium-graphite reactor prototypes now proposed.

In accordance with the invention, a stabilizing agent is added to and dissolved in said solution of UND in TBA at a temperature above 50° C. Generally speaking, the additives are low molecular weight organic acids or organic acid derivatives (anhydrides) including lactic, acetic and monochloroacetic acids and acetic anhydride. As disclosed more specifically hereinafter, the amount of additive required is directy dependent upon the absolute amount of UND in the TBA solution and may be expressed in moles of additive per mole of UND.

Lactic Acid

The most effective amounts of lactic acid as a stabilizing additive correspond to a ratio in the range of 0.7 to 1.1 moles per mole of UND. With higher and lower concentration ratios earlier precipitation occurs. The lactic acid should be added directly to the UND-TBA solution since an exothermic reaction occurs upon contact of UND directly with lactic acid.

Acetic Acid

The most effective amount of acetic acid is 0.6 to 1.2 moles of acetic acid per mole of UND in the TBA. Such solutions have been found to be stable for at least 60 days. A precipitate occurs in less time above and below these concentration ratio range extremes. Acetic acid has a relatively low freezing point and tends to esterify the TBA requiring some compensation in impregnation processing techniques.

Monochloracetic Acid

The most effective amount of monochloroacetic acid is approximately the same as that required for acetic acid, i.e., 0.6 to 1.2 moles per mole of UND. Moreover, chloroacetic acid can be used to replace TBA completely in the process. It has, however, less desirable properties than the TBA and, in addition, is corrosive to processing equipment containing copper.

Acetic Anhydride

The most effective amount of acetic anhydride has been found to be 0.1 to 0.5 moles of acetic anhydride per mole of UND.

UND-TBA solutions containing one of the above additives in specific amounts are in general stable for times of two weeks or more; stability time varies with the concentrations of the three constituents. Two other properties of these solutuions important in the impregnation of graphite also vary with time; namely, solidification and freezing temperatures. For example, with respect to stability, solutions containing varying amounts of lactic acid are stable for periods of time from 2 to over 45 days, as shown in Table 2. Solidification temperatures for given solutions, at which temperature a gel is formed, all tend to become lower over a period of time; the temperatures below which solutions containing each of the four additives solidify are shown in Table 1 for different days after preparation of the solution. The solidified or frozen solution may be re-dissolved upon raising the temperature of the solution above the solidification temperature as long as it remains stable. As shown by Table 1 the solution must be maintained normally at a temperature of 40° or 50° in order to avoid solidification and this is the temperature most advantageous for impregnation as discussed hereinbefore. Unstable precipitated solutions cannot be re-dissolved by raising the temperature, and/or by adding a stabilizer, and/or by adding more TBA.

In the preparation of uranium impregnated graphite using the stabilized solutions of the present invention, there is first provided or selected a graphitic material of purity and other properties satisfactory for use in neutronic reactors, e.g., graphite of very low content of boron and other reactor poisons and of proper structural properties. The graphite pieces are generally in the shape of core pieces which will be assembled later to form a reactor core configuration, e.g., a cylindrical core having axial bores therethrough for passage of gaseous or liquid coolant. The entire core may be coated with a heat resistant material, e.g., NbC or ZrC, after impregnation to preclude uranium diffusion or graphite erosion, or other fabrication and assembly techniques may be used which are known in the art but which are no part of the present invention.

Accordingly, after selection of the graphite pieces, the graphite density distribution and total available void volume are next determined. The density distribution must be uniform in order to insure uniform uranium distribution and deviates are therefore rejected. The total available void volume, or "available porosity" must be known in order to determine the uranium impregnant concentration necessary to impregnate the graphite with enough uranium to produce a critical assembly for the particular reactor configuration chosen. Requirements generally vary from one mole uranium per 350 moles carbon to one mole uranium per 2000 moles carbon. Ease of impregnation is also partially dependent upon pore size. Graphite with an average of about 15% voids has been found well suited for most uses; typical pore size distribution for such graphite is shown in the accompanying figure.

A TBA solution containing additives as discussed hereinbefore and an amount of UND calculated to impregnate the graphite with the proper uranium content is next prepared. Impregnation of the graphite is carried out by first placing the graphite pieces in the bottom of a stainless steel, glass or other container which is capable of being exteriorly heated and evacuated. The process is carried out using the process taught in U.S. Patent Application S.N. 417,099, filed Mar. 17, 1954, James J. Shyne, now U.S. Pat. No. 2,969,294 issued Jan. 24, 1961, Impregnating Graphite, and generally known as the North American Aviation method. Variations taught in a copending U.S. Patent Application No. 769,521, filed Oct. 24, 1958, Geoffrey R. Tully, Jr., et al. Improved Method of Impregnation of Graphite, are also utilized. This last-named application discloses the state of the art; pertinent sections are also discussed hereinafter in this application.

Accordingly, the container is evacuated with an ordinary mechanical pump in order to remove gases both entrapped in the graphite pores and chemi-adsorbed in the graphite itself. Ease of impregnation is somewhat correlative with the evacuation time; however, evacuation times of an hour or less generally suffice. Sufficient UND-TBA solution containing an additive and heated to 40° to 70° C. is now added to the container to immerse the graphite pieces and an additional amount is added corresponding to the volume of the graphite pores which will be impregnated. The temperature is maintained above the solidification point. Atmospheric pressure is maintained over the solution; this pressure combined with the weight of the solution immediately forces an amount of the soltuion into the exterior pores. An over pressure may be used to increase the depth of penetration. The depth of penetration without further process steps is limited however, and maximum penetration will generally be achieved within an hour. The depth may be increased by alternately evacuating the free volume above the solution and pressurizing it. Evacuation of the volume lowers the pressure within the graphite pores and is accompanied by formation of bubbles of entrapped gas at the surface of the graphite. This gas continues to rise through the liquid to the surface thereof for a short period of time, of the order of thirty minutes, until gas evolution ceases. An overpressure is then applied upon the liquid and the liquid penetrates the graphite to a depth greater than the previous penetration. Further vacuum and overpressure cycles impregnate the graphite to greater depths. Because in a neutronic reactor heat must be conducted from the interior of the impregnated graphite to the exterior thereof, there may be a limit to the depth the graphite should be loaded with uranium without causing interior portions to be heated excessively. The depth of impregnation encountered in present designs is generally less than 650 mils, which depth can be achieved by the present method.

After impregnation the solution is dropped away and the graphite blocks removed from the containers. The impregnated solution is frozen in liquid nitrogen and maintained at a temperature just below the freezing point of the solution. The graphite block is then subjected to a vacuum, whereby the solution sublimes, leaving the UND deposited within the graphite pores. The UND decomposes to an oxide of uranium upon heating the graphite to a few hundred degrees centigrade, and the uranium may be further reduced to the carbide by prolonged heating at higher temperatures. The graphite piece is now ready for use in fueling and moderating a nuclear reactor.

An actual nuclear reactor design incorporating graphite blocks uniformly impregnated with enriched uranium oxide is discussed in "Proceedings of the 1953 Conference on Nuclear Energy," pages A–15 to A–33, held at the University of California at Berkeley, September 9–11, 1953, and available from California Book Company, 2310 Telegraph Avenue, Berkeley 4, California. See also Glasstone, "Principles of Nuclear Reactor Engineering," (D. Van Nostrand Co.), page 725, paragraph 12.31, and *Science*, 119,15 (1954). In the typical research reactor described, the impregnated graphite core comprises approximately 800 liters of graphite moderator having a total uranium-235 mass of approximately 3.5 kilograms. Uranium-235 concentration is approximately 4.5 milligrams/cc. of graphite. The graphite is in the form of 140 stacked blocks which have physical dimensions of 4.18 inches on a side, 21 inches long, and a 1.25 inches-in-diameter coaxial hole extending the entire length. In operation, the coaxial holes in the graphite stacks are used to convey a coolant fluid, thereby continuously cooling the fuel blocks.

Design of a gas cooled mobile prototype reactor comprising a uranium impregnated graphite core material having axial bores therethrough for flow of liquid and/or gas coolant or propellant is described in detail in Report UCRL–4960, entitled Tory I Reactor, dated September 1957, University of California Radiation Laboratory, Berkeley, California. In the reactor as designed, the fuel and core operate at temperatures up to 3000° C. while the heavy water reflector is at room temperature and the liquid gas coolant enters the reactor at a very low temperature and emerges at a temperature approximating that of the core. Nitrogen, hydrogen and/or ammonia is used as coolant under an initial pressure of 305 p.s.i. Because of the high temperature of operation a carbon wool blanket is preferably disposed between the core and heavy water reflector. Operating time is a few minutes. The core comprises 19 graphite columns, hexagonal or modified hexagonal cross sections 5.4 inches across flats, each composed of ten 5.2 inch long graphite blocks impregnated with 92% $U^{235}$ at a carbon to uranium ratio of 800:1. Total weight of $U^{235}$ is about 34.4 pounds, depending upon the core configuration. End reflectors are graphite, and the axial reflector comprises 12,400 pounds of heavy water.

The invention will be better understood upon examination of the following examples.

EXAMPLE I

An experiment was undertaken to investigate the additive solution stability and gradual downward shift in the temperature at which the solution solidification or freezing takes place after the addition of additives to the UND-TBA solution. The vapor pressure of frozen solutions is lower at lower temperatures, and therefore as the freezing point is lowered a longer time period must be allowed to completely sublimate the frozen solvent from impregnated graphite. In carrying out the experiment solutions of each stabilizer were made up in accordance with specifications set forth hereinbefore and maintained at room temperature. On the days indicated in Table I, the solution temperature was raised until the solid solution dissolved and then the temperature was lowered until solidification again occurred. UND-TBA solutions not containing additives freeze at a maximum temperature of 18.4° C. at the UND-TBA eutectic; this temperature does not change with the passage of time. However, solvolysis takes place after two or three days, thereby rendering said solutions completely useless. The results of the experiment are shown in Table I. It is to be noted that the solutions were stable above the solidification or freezing temperature for the entire 13 days, and that the solidification temperature was only moderately lower at the end of the same time.

TABLE I

| | Concentration range in moles per mole UND | Fresh solution | Solidification temperature, ° C. (days)— | | | |
|---|---|---|---|---|---|---|
| | | | 3 | 6 | 10 | 13 |
| Lactic acid | 0.7–1.1 | 35 | | 3 | | |
| Acetic acid | 0.6–1.2 | 49.5 | 39 | 28 | | 21 |
| Acetic anhydride | 0.1–0.5 | 52 | 40 | 35 | 35 | 23 |
| Chloracetic acid | 0.6–1.2 | | 31 | 36 | | 18 |

EXAMPLE II

To determine the stability of UND-TBA solutions containing lactic acid additive at constant temperature, batches of solution were made up as discussed hereinbefore containing 45 wt. percent UND and varying amounts of lactic acid. The temperature was raised to 50° C. and held thereabout and the solutions were checked daily to see if any precipitation had occurred. The solutions remained stable for periods longer than 45 days, depending upon the concentration of lactic acid, as shown in Table II.

TABLE II

| Weight percent of— | | | Temperature, ° C. | Stability period (days) |
|---|---|---|---|---|
| UND | TBA | Lactic | | |
| 45 | 52.5 | 2.5 | 50 | 20 |
| 45 | 50.0 | 5.0 | 50 | 22 |
| 45 | 47.5 | 7.5 | 50 | 34 |
| 45 | 45.0 | 10.0 | 50 | >45 |
| 45 | 42.5 | 12.5 | 50 | 6 |
| 45 | 40.0 | 15.0 | 50 | 2 |

EXAMPLE III

Three pieces of graphite were selected for simultaneous impregnation using the additive solution. The first piece was Union Carbide & Carbon Corporation, 15% voids, near reactor grade, "ATJ" graphite in the shape of a solid rectangular parallelepiped of dimensions 1.3 by 1.3 by 3 inches. Maximum distance from any surface to the center was 650 mils. The second piece was an "ATJ" hexagon 3½ inches between parallel sides and 4 inches long. Along the longitudinal axis were 177 holes 0.88 inches in diameter so spaced that maximum penetration to a common center from another surface would be 65 mils. The third piece was Union Carbide C–18 graphite, also in the shape of a hexagon, but 6 inches between parallel surfaces and 5.2 inches in length. It contained one one-eighth inch diameter hole down its center. All three pieces were weighed and pretreated by placing them under a vacuum pressure that approached 29 microns for 16 hours while the temperature was maintained at 50° C. The three pieces were then immersed in a solution of 43% UND by weight in TBA containing 0.8 moles lactic acid per mole UND, and having a density of 1.200 and a viscosity of 28 centipoises. Three vacuum and overpressure cycles were applied to the liquid containing the graphite, while holding the temperature at 50° C., as follows:

Vacuum—14 in. Hg, 5 min.
Pressure—10 lb./sq. in., 25 min.
Vacuum—14 in. Hg, 25 min.
Pressure—11 lb./sq. in., 15 min.
Vacuum—14 in. Hg, 25 min.
Pressure—10 lb./sq. in., 25 min.

The solution was then dropped away from the pieces. The impregnated solution was then frozen and sublimed in an evacuated chamber from the frozen state. The pieces were then heated in a thermal reduction process, wherein the uranium was converted to the oxide, after which wafers were cut out of the center of each piece along its longitudinal axis. X-ray examination showed 14 to 18 mm. penetration of the solid piece, complete penetration of the "hex" block with the large number of holes, and irregular but almost complete penetration of the "hex" block with the one hole. On a weight basis the following average uranium to carbon ratios were established: 4.5 g. uranium per 100 grams carbon for the C-18 graphite; 2.4 g. U/100 g. C. for the ATJ graphite with the large number of holes; and 1.8 g. U/100 g. C for the solid ATJ graphite piece.

While the invention has been disclosed with respect to several preferred embodiments, it will be apparent to those skilled in the art that numerous variations and modifiations may be made within the spirit and scope of the invention and thus it is not intended to limit the invention except as defined in the following claims.

What we claim is:

1. A composition consisting of uranyl nitrate dihydrate and a solution stabilizing material selected from the group consisting of lactic, acetic and chloroacetic acid, and acetic anhydride dissolved in tertiary butyl alcohol.

2. The composition of claim 1 in which the solution stabilizing material is lactic acid.

3. The composition of claim 2 in which the concentration of the lactic acid is between 0.7 moles and 1.1 moles lactic acid per mole of uranyl nitrate dihydrate.

4. The composition of claim 1 in which the solution stabilizing material is acetic acid.

5. The composition of claim 4 in which the concentration of the acetic acid is between 0.6 and 1.2 moles per mole of uranyl nitrate dihydrate.

6. The composition of claim 1 in which the stabilizing material is chloroacetic acid.

7. The composition of claim 6 in which the concentration of the chloroacetic acid is between 0.6 and 1.2 moles per mole of uranyl nitrate dihydrate.

8. The composition of claim 1 in which the stabilizing material is acetic anhydride.

9. The composition of claim 8 in which the concentration of the acetic anhydride is 0.1 to 0.5 moles per mole of uranyl nitrate dihydrate.

10. A method for stabilizing solutions of uranyl nitrate dihydrate dissolved in tertiary butyl alcohol comprising adding to said solution a material selected from the group consisting of lactic acid, acetic acid, chloroacetic said, and acetic anyhdride.

11. A composition for use in the impregnation of graphite uranium comprising 45 wt. percent uranyl nitrate dihydrate dissolved in 52.5 to 42.5 wt. percent tertiary butyl alcohol to which 2.5 to 12.5 wt. percent lactic acid has been added.

12. A stabilized solution for use specifically in the impregnation of graphite with uranium and generally in other phases of nuclear science endeavors consisting essentially of uranyl nitrated dihydrate and a stabilizer selected from the group consisting of lactic, acetic and chloroacetic acid, and acetic anhydride dissolved in tertiary butyl alcohol.

13. A stabilized composition in which the solvolysis of uranium materials is prevented by stabilizing material, consisting essentially of uranyl nitrate dihydrate and a stabilizer material selected from the group consisting of lactic, acetic and chloroacetic acid, and acetic anhydride dissolved in tertiary butyl alcohol.

14. A composition consisting essentially of from 15 to 45 weight percent uranyl nitrate dihydrate and a solution stabilizing material selected from the group consisting of lactic, acetic and chloroacetic acid, and acetic anhydride dissolved in tertiary butyl alcohol.

No references cited.

CARL D. QUARFORTH, Primary Examiner

P. A. NELSON, Assistant Examiner

U.S. Cl. X.R.

423—253